(12) United States Patent
Narayanan et al.

(10) Patent No.: US 10,715,669 B2
(45) Date of Patent: Jul. 14, 2020

(54) SYSTEMS AND METHODS FOR CONTROLLING TRANSFER OF CONTACTS IN A CONTACT CENTER

(71) Applicant: Avaya Inc., Basking Ridge, NJ (US)

(72) Inventors: Lakshmi Narayanan, Chennai (IN); Prem Kumar Bhavnani, Pune (IN); Harshad R. Apshankar, Kothrud (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/882,076

(22) Filed: Jan. 29, 2018

(65) Prior Publication Data

US 2019/0238680 A1 Aug. 1, 2019

(51) Int. Cl.
*H04M 3/00* (2006.01)
*H04M 3/523* (2006.01)
*H04M 3/51* (2006.01)
*H04M 3/58* (2006.01)

(52) U.S. Cl.
CPC ....... *H04M 3/5232* (2013.01); *H04M 3/5166* (2013.01); *H04M 3/58* (2013.01); *H04M 3/5237* (2013.01)

(58) Field of Classification Search
CPC . H04M 3/5232; H04M 3/5166; H04M 3/5237
USPC ...... 379/265.01–265.14, 266.01–266, 1, 309
See application file for complete search history.

(56) References Cited

U.S. PATENT DOCUMENTS

| | | | |
|---|---|---|---|
| 5,915,010 A | 6/1999 | McCalmont | |
| 5,999,965 A * | 12/1999 | Kelly | H04M 3/523 709/202 |
| 6,215,865 B1 | 4/2001 | McCalmont | |
| 6,650,748 B1 * | 11/2003 | Edwards | H04M 3/523 379/265.01 |
| 7,295,669 B1 | 11/2007 | Denton et al. | |
| 8,611,525 B2 | 12/2013 | Cai | |
| 9,088,658 B2 | 7/2015 | Jordan et al. | |
| 9,880,807 B1 * | 1/2018 | Haggerty | H04M 11/00 |
| 2011/0280391 A1 * | 11/2011 | Venugopal | H04M 3/5175 379/266.1 |
| 2012/0316907 A1 * | 12/2012 | Nimmagadda | G06Q 10/0631 705/7.14 |
| 2015/0030152 A1 * | 1/2015 | Waxman | H04M 3/5233 379/265.11 |
| 2016/0057284 A1 * | 2/2016 | Nagpal | H04M 3/5232 379/266.07 |
| 2016/0086125 A1 * | 3/2016 | Hanrahan | G06Q 10/06398 705/7.42 |
| 2016/0182719 A1 * | 6/2016 | Skiba | H04M 3/5233 379/265.05 |
| 2018/0205828 A1 * | 7/2018 | Conway | H04M 3/5233 |
| 2019/0057340 A1 * | 2/2019 | Wang | G06Q 10/063114 |

* cited by examiner

*Primary Examiner* — William J Deane, Jr.
(74) *Attorney, Agent, or Firm* — Stevens & Showalter LLP

(57) ABSTRACT

Managing contact transfer requests in a contact center with a processor of the contact center receiving a request to transfer a contact to a destination within the contact center. Next, the processor determines in real time, one or more first characteristics related to a source of the request and one or more second characteristics related to the destination of the request. Ultimately, based on the one or more first characteristics and the one or more second characteristics, the processor performs one of: a) transferring the contact to the destination, or b) preventing transfer of the contact to the destination.

20 Claims, 5 Drawing Sheets

SYSTEMS AND METHODS FOR CONTROLLING TRANSFER OF CONTACTS IN A CONTACT CENTER

BACKGROUND

The present disclosure relates generally to contact transfer requests in a contact center, and, more particularly, to dynamically determining whether or not to reject the transfer request.

Two conventional ways of transferring a contact include a "blind transfer" and an "announced transfer"; the latter is sometimes referred to as an "consultative transfer".

In an announced transfer, the originating resource that is in communication with the contact transfers the contact by initially placing the contact in a queue for a particular contact center resource or in a queue for a particular customer service workgroup. The originating resource stays on the line with the contact until a receiving contact center resource is reached. The originating resource then informs the receiving resource of the reason for the transfer (e.g., a need for particular services of the receiving resource). At this point the originating resource can complete the transfer by disconnecting from the contact.

In a blind transfer, the originating resource transfers a contact to a receiving agent queue or workgroup queue and releases or disconnects from the contact. The originating resource does not stay on the line with the contact being transferred. In this way, the originating resource becomes available for a next incoming contact and can immediately receive and handle another contact.

Each type of transfer has some drawbacks that can result in work items/contacts being assigned and routed in a contact center in a manner that adversely impacts the operation of the contact center efficiently and accurately handle incoming contacts. Thus, a need exists for improved methods and systems within the computer architecture of a modern contact center to dynamically allow or disallow transfers of contacts based on configured or real-time parameters of the contact center's operation.

BRIEF SUMMARY

One aspect of the present disclosure relates to a method for managing transfer requests in a contact center. The method includes receiving, by a processor of the contact center, a request to transfer a contact to a destination within the contact center and determining by the processor, in real time, one or more first characteristics related to a source of the request and one or more second characteristics related to the destination of the request. The method continues by the processor performing one of: transferring the contact to the destination, or preventing transfer of the contact to the destination, based on the one or more first characteristics and the one or more second characteristics.

Another aspect of the present disclosure relates to a system for managing transfer requests in a contact center. The system includes a memory device, storing executable instructions and a processor in communication with the memory device. In particular, the processor when executing the executable instructions: a) receives a request to transfer a contact to a destination within the contact center, and b) determines, in real time, one or more first characteristics related to a source of the request and one or more second characteristics related to the destination of the request. Based on the one or more first characteristics and the one or more second characteristics, the processor performs one of: transferring the contact to the destination, or preventing transfer of the contact to the destination.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

Figure 1:
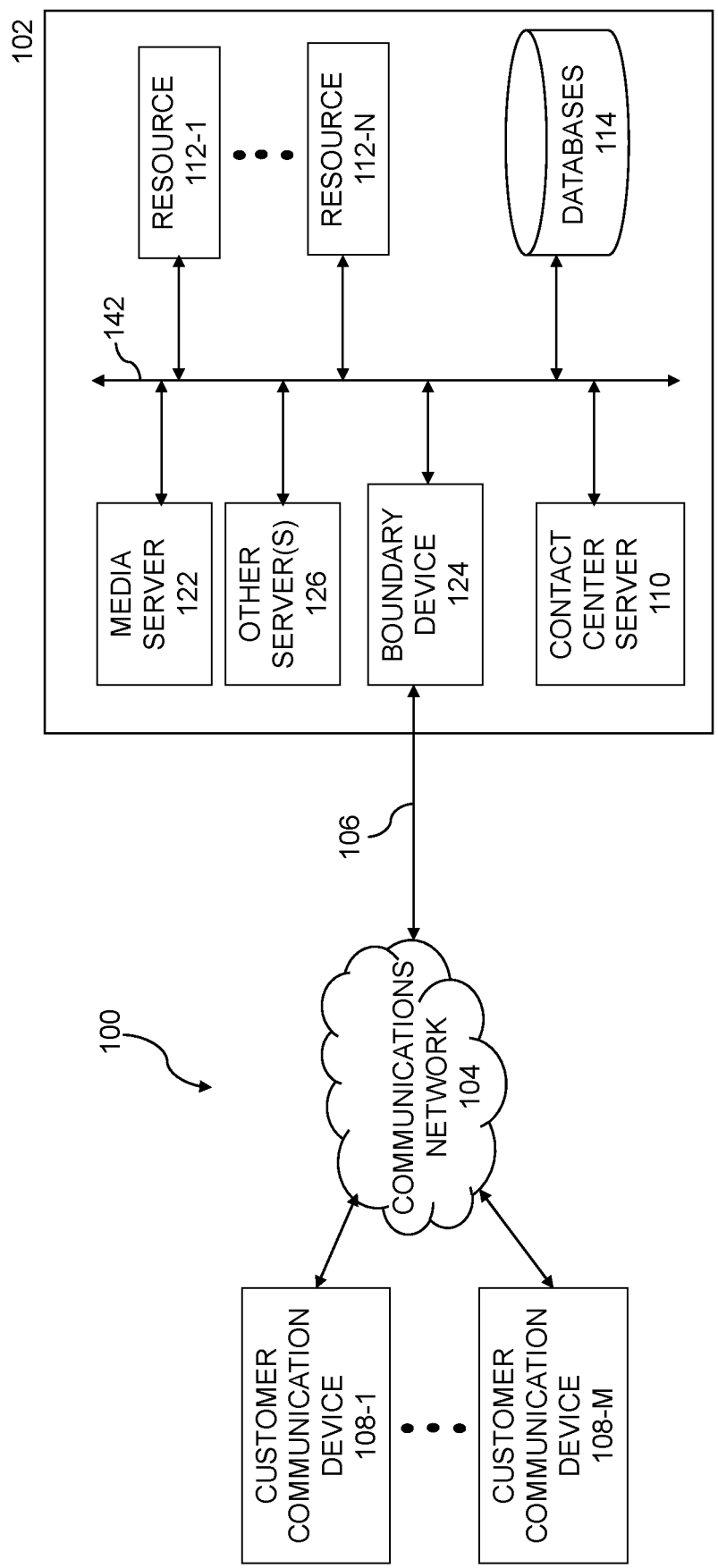
FIG. 1 illustrates a communications system architecture in accordance with the principles of the present disclosure.

The present disclosure will be illustrated below in conjunction with an exemplary communications system. Although well suited for use with, e.g., a system having an Automated Call or Contact Distribution (ACD) system or other similar contact processing switch, the present disclosure is not limited to any particular type of communications system switch or configuration of system elements. Those skilled in the art will recognize that the disclosed techniques may be used in any communications application in which it is desirable to provide improved contact processing.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for illustrative purposes only and should not be construed as limiting of the scope of embodiments of the present disclosure.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communication from a user or a customer. The communications may be by way of any communications medium such as, but not limited to, a telephone call, email, instant message, web chat, and the like. The terms "user" and "customer" denote a party external to the contact center and are used herein to refer to the other party to a contact or a communications session. A user or customer may include, for example, a person having a commercial relationship with the contact center or with a business represented by the contact center.

For each contact received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated that those individual aspects of the present disclosure may be separately claimed.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP).

FIG. 1 shows an exemplary embodiment of a communications system 100 according to the present disclosure. The communications system 100 may comprise a communications network 104 connecting components of a contact center 102 via a communications link 106 to one or more customer communication devices 108-1 to 108-M, where M is an integer, M≥1 (referred to herein collectively as a customer communication device 108). Each customer communication device 108 may be associated with a contact or customer and may comprise, for example, a cellular phone, computer, Personal Digital Assistant (PDA), digital or analog phone, and the like. The communications network 104 may comprise any type of known communication medium or collection of communication media and may use any type of protocols to transport messages between endpoints. The communications network 104 may be packet-switched and/or circuit-switched and may include wired and/or wireless technologies.

The contact center 102 may comprise, for example, a boundary device 124, a central contact center server 110, a media server 122, one or more other servers 126, and a set of data stores or databases 114. The additional servers 126 may include, for example, an Interactive Response unit (IVR), a voice portal, a video call server, an email server, and the like. Some or all of the components of the contact center 102 may be interconnected by an internal network 142 such as a local area network (LAN) or WAN. One or more of the components of the contact center 102 may also be connected via one or more optional communications links (not shown) to one or more other components of the contact center 102.

Although depicted as separate servers and/or applications that are co-located with one another, it should be appreciated that such a configuration of components is not required. For example, some or all of the functions depicted in FIG. 1 may be co-hosted and/or co-resident on a single server and/or processor, e.g. the contact center server 110, and/or two or more of the contact center 102 components may be distributed and connected to one another over the communication network 104, with the communications between these components may be secured with tunneling protocols or a Virtual Private Network (VPN; not shown). In addition, although one central contact center server 110 is depicted in FIG. 1, two or more servers 110 may be provided in a single contact center 102 or across multiple separate LANs 142 owned and operated by a single enterprise, but separated by the communications network 154. Likewise, two or more media servers 122 may be provided in the contact center 102. In configurations where the contact center 102 includes two or more servers 110 and/or media servers 122, each server 110, 122 may comprise similar functionality, but may be provisioned for providing its features to only a subset of all contact center users.

A customer associated with a customer communication device 108 may utilize the device 108 to generate and transmit a communication, such as a telephone call, an email message, an instant message (IM), an SMS message, etc., over the communications network 104, which is received as a contact at the contact center 102. The contact may be received at the boundary device 124, which maintains a secure separation between the communication network 104 and the internal network 142 and facilitates communications between the customer communication device 108 and the contact center 102. The boundary device 124 may include the functionality of one or more of a switch, a computer-telephony integration (CTI) interface, a SIP gateway, a security gateway, a firewall, a router, or the like. A boundary device 124 comprising a SIP gateway may, for example, connect with one or more SIP trunks from the communications network 104 and split incoming aggregate SIP traffic into individual SIP sessions and aggregate the individual outbound SIP sessions. The boundary device 124 may be implemented as hardware such as via an adjunct processor (as shown) or as a chip in the contact center server 110 (not shown).

Following receipt at the contact center 102, a contact object is instantiated for each contact as described herein and the contact objects are distributed to a plurality of resources 112-1 to 112-N, wherein N is an integer, N≥1 (referred to collectively herein as resource 112). Each resource 112 represents a processing resource of the contact center 102 and may comprise completely automated resources (e.g., processors, servers, or the like), human resources utilizing communication devices (e.g., human agents utilizing a computer, telephone, laptop, etc.), or any other resource known to be used in a contact center 102. In some embodiments, contact objects may be assigned to the IVR (not separately labeled), a voice portal (not separately labeled), or other component of the contact center 102 for automated customer service processing prior to or simultaneous with assigning the contact object to a human resource (e.g., a contact center agent). For example, the voice portal and the IVR may work together to provide IVR services to the contacts.

Each resource 112 may be associated with a resource communication device (not shown), which may be a packet-switched device such as a computer workstation, an IP hardphone or softphone, a packet-based H.320 video phone and conferencing unit, a packet-based voice messaging and response units, a packet-based traditional computer telephony adjunct, a peer-to-peer based communications device, and/or any other suitable communications device. These packet-switched devices may be SIP compatible. The resource communication device may also comprise circuit-switched devices that each correspond to one of a set of internal extensions and may include, for example, wired and wireless telephones, voice messaging and response units, traditional computer telephony adjuncts, and any other suitable communications device.

Figure 2:
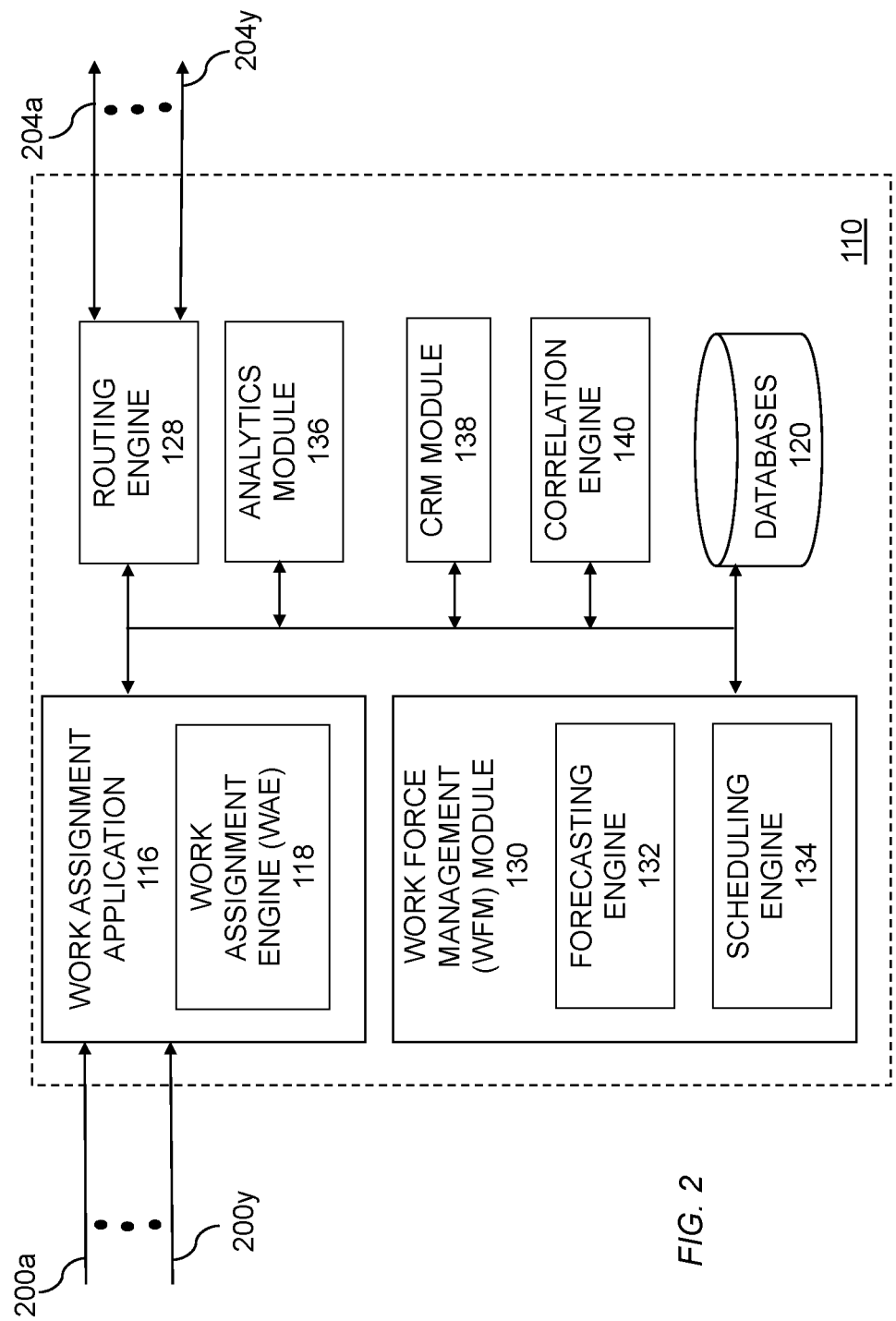
FIG. 2 illustrates aspects of a contact center server in accordance with principles of the present disclosure.

With reference to FIG. 2, the contact center server 110 may further comprise a work assignment application 116, a routing engine 128, a work force management (WFM) module 130, an analytics module 136, a customer relationship management (CRM) module 138, a correlation engine 140, and one or more database(s) 120. Although each of these functions is depicted in FIG. 2 as residing on the contact center server, it should be appreciated that one or more of the functions, such as the routing engine 128, may reside elsewhere and/or be executed by another server/engine.

Each contact object may comprise one or more work items and generally comprises at least a request for a resource 112. The format of each work item may depend upon the capabilities of the communication device 108 and the format of the communication. In particular, work items are logical representations within the contact center 102 of work to be performed in connection with servicing a particular contact received at the contact center 102 (and more specifically at the work assignment application 116). Work items may be received at the work assignment application 116 from the customer communication devices 108 via one or more customer communications lines or channels 200a to 200y (which may be one or more trunks, phone lines, etc.) and maintained at the work assignment application 116, a switch or server connected to the work assignment application 116, or the like until a resource 112 is assigned to the work item. The work assignment application 116 comprises a work assignment engine 118 that enables the work assignment application 116 to make intelligent routing decisions for work items. As used herein, assignment and/or routing of a contact or contact object to a resource and association of contact attributes with the contact or contact object are intended to be synonymous with assignment and/or routing of the work item(s) associated with the contact or contact object to a resource and association of contact attributes with the work item(s).

The work assignment engine 118 may determine which of the plurality of processing resources 112 is qualified and/or eligible to receive the work item and further determine which of the plurality of processing resources 112 is best suited to handle the processing needs of the work item. In situations of a work item surplus, the work assignment engine 118 may also determine an optimal assignment of a work item resource to a particular resource, e.g., resource 112-1. In some embodiments, the work assignment engine 118 may be configured to achieve true one-to-one matching by utilizing bitmaps/tables and other data structures. Following assignment of the resource 112-1 to a work item, the work assignment application 116 passes the work item to the routing engine 128 to connect the customer communication device 108 that initiated the communication with the assigned resource 112-1 via one of a plurality of resource communications lines 204a to 204y (which may be a voice-and-data transmission line such as a LAN 142 and/or a circuit switched voice line).

The WFM module 130 may be configured to manage the workforce of the contact center 102 (namely the human resources 112). The WFM module 130 may comprise a variety of functionalities, such as a forecasting engine 132 and a scheduling engine 134, that operate together to achieve optimal management of the workforce. The forecasting engine 132 may monitor current work item volume, current resource availability/utilization, past work item volume, past resource availability/utilization, estimated wait times, service levels, and other objectives and provides a forecast or estimate of the work item volume and required staffing levels in the contact center 102 for a desired shift period. For example, the forecasting engine 132 may be configured to monitor one or more Service Level Agreements (SLAs)

between the contact center 102 and one or more clients or customers of the contact center 102 to ensure compliance with the applicable SLA(s).

The scheduling engine 134 uses the information provided by the forecasting engine to schedule human agents, e.g., resources 112, to work in the contact center 102. Additionally, the forecasting engine 132 may automatically identify future resource availability issues (in the short-term or long-term) and notify the scheduling engine 134, thereby enabling the scheduling engine 134 to adjust the scheduling of resources 112 as necessary. In some embodiments, the forecasting engine 132 is capable of analyzing prior and current contact center performance to determine if the contact center 102 will require more or less resources 112 at any particular time, e.g., the beginning or end of a calendar month. The scheduling engine 134 may also be configured to monitor schedule adherence, social media activity, and the like, and the WFM module 130 may enable shift bidding, schedule adjustments, work-at-home resource re-scheduling, and the like.

The analytics module 136 may be utilized to track trends and generate one or more reports that indicate agent performance and overall performance of the contact center 102. In some embodiments, the analytics module 136 may be configured to pull data stored in one or more databases 114, 120 and prepare the data in a human-readable format. The database(s) 114, 120 may be configured to store information about any or all components of the contact center 102 such as statistics related to the WFM module 130 (e.g., resource utilization, compliance with SLA agreements, compliance with objectives, etc.), resource performance statistics (e.g., Key Performance Indicators (KPIs)), and statistics related to the WAE 118 (e.g., decisions per time period, successful routing decisions, estimated wait time, etc.). Advantageously, the analytics module 136 may be configured to run one or more reports for predefined data automatically at predefined intervals. The analytics module 136 may also be enabled to run ad-hoc reports based on inputs received from a contact center administrator or manager. Further still, the analytics module 136 may be configured to run reports in response to a predetermined event or series of events occurring in the contact center 102.

The CRM module 138 may be configured to collect and manage historical customer information, current customer information, information related to interactions between a customer and a contact center 102, customer preferences, customer purchase history, customer return history, customer aliases (e.g., in social media networks), and the like. Such information may be stored and maintained in one or more of the database(s) 114, 120. The CRM module 138 may be utilized to help the contact center 102 provide a more robust and personalized customer service experience. In some embodiments, the CRM module 138 may retrieve desired CRM information from the database(s) 114, 120 to enable one of the resources 112 to more efficiently process a work item for a returning or known customer. For example, when a work item is received in a contact center 102 and the work item is associated with a customer having historical information stored as CRM information in one of the databases 114, 120, the CRM module 138 may retrieve some or all of the CRM information and provide the retrieved information to a resource 112, thereby enabling the resource 112 to provide a more personalized service to the customer.

Although some embodiments are discussed with reference to a client-server architecture, it is to be understood that the principles of the present disclosure apply to other network architectures. For example, the present disclosure applies to peer-to-peer networks, such as those envisioned by SIP. In the client-server model or paradigm, network services and the programs used by end users to access the services are described. The client side provides a user with an interface for requesting services from the network, and the server side is responsible for accepting user requests for services and providing the services transparent to the user. By contrast, in the peer-to-peer model or paradigm, each networked host runs both the client and server parts of an application program. Additionally, the disclosure does not require the presence of packet- or circuit-switched networks.

In some embodiments, the contact center server 110 and its various functionalities may be configured to administer and make work assignment decisions in a queueless contact center, as described in U.S. Pat. No. 8,634,543, the entire contents of which is hereby incorporated herein by reference.

In other embodiments, the server 110 may be configured to execute work assignment decisions in a traditional queue-based (or skill-based) contact center, as described in U.S. Pat. No. 8,234,141, the entire contents of which is hereby incorporated herein by reference. Skill-based contact centers may maintain a resource profile, which includes information related to each resource's skills, level(s) of skill expertise, and training, as well as metrics associated with a plurality of work items serviced by the resource for each resource skill (e.g., contact type, duration, and resolution, ratings from the customer and/or a supervisor, etc.). The resource profiles may be stored, for example, in one or more contact center database(s) (e.g., 114, 120 in FIGS. 1 and 2). This resource information is used to assign each resource to one or more skill groups or resource queues (not shown). When a new contact is received at a skill-based contact center, information about the contact is determined, such as the customer's identity and current needs, customer value, and the resource skill that is required for the proper handling of the contact, and this information, along with additional data such as current contact center queue lengths, is used to assign each new contact to a work item queue (not shown). Some of the information related to the contact may be maintained in a customer profile, which may also be stored, for example, in one or more contact center database(s) (e.g., 114, 120 in FIGS. 1 and 2). Contacts are assigned to resources based on a comparison of the resource skill required to service the contact and the skillset(s) of each resource.

In further embodiments, the server 110 and its various functionalities are configured to execute work assignment decisions in an attribute-based contact center, such as a contact center using the Avaya Oceana™ Solution. Similar to a skill-based contact center, attribute-based contact centers gather information about customers and assign each contact to a resource based on matching between customer and resource data. However, attribute-based matching provides a match based on a plurality of individual attributes of the contact and the resource, as opposed to matching based on a single "skill" assigned to the contact in a traditional skill-based setting. Attribute-based matching provides more details about the contacts and delivers a greater degree of granularity than traditional skill-based matching, which permits more accurate forecasting of future needs.

In an attribute-based contact center, a list of contact attributes is assigned to, or associated with, each incoming contact, in which the attributes describe the optimal resource for handling the contact. The contact attributes may include real-time or current information related to the present communication, such as a type of assistance required (sales, support, etc.), channel type (voice, email, etc.), a current customer mood or behavior (as identified using, for example, detection of certain keywords, repeated clicking or tapping, etc.), and the like. The contact attributes may also include historical or contextual data related to one or more previous communications with the customer, such as a preferred language, a preferred region for resource location, a customer priority, and the like. The contextual data may be combined from multiple communications channels and/or communications sessions and may be stored in the customer profile. Information related to the attributes of each resource (e.g., languages spoken, geographic location, personality type, etc.) may similarly be stored in a resource profile. The list of contact attributes is compared to the unique combination of attributes assigned to each resource, and the contact is routed to the most suitable resource based on a matching combination of attributes. Matching based on individual attributes ensures that each incoming contact is assigned to the most suitable resource, thereby improving first call resolution. Attribute-based matching also allows the contact center to more accurately anticipate the volume and type of future incoming contacts and to forecast the required staffing levels.

Figure 3:
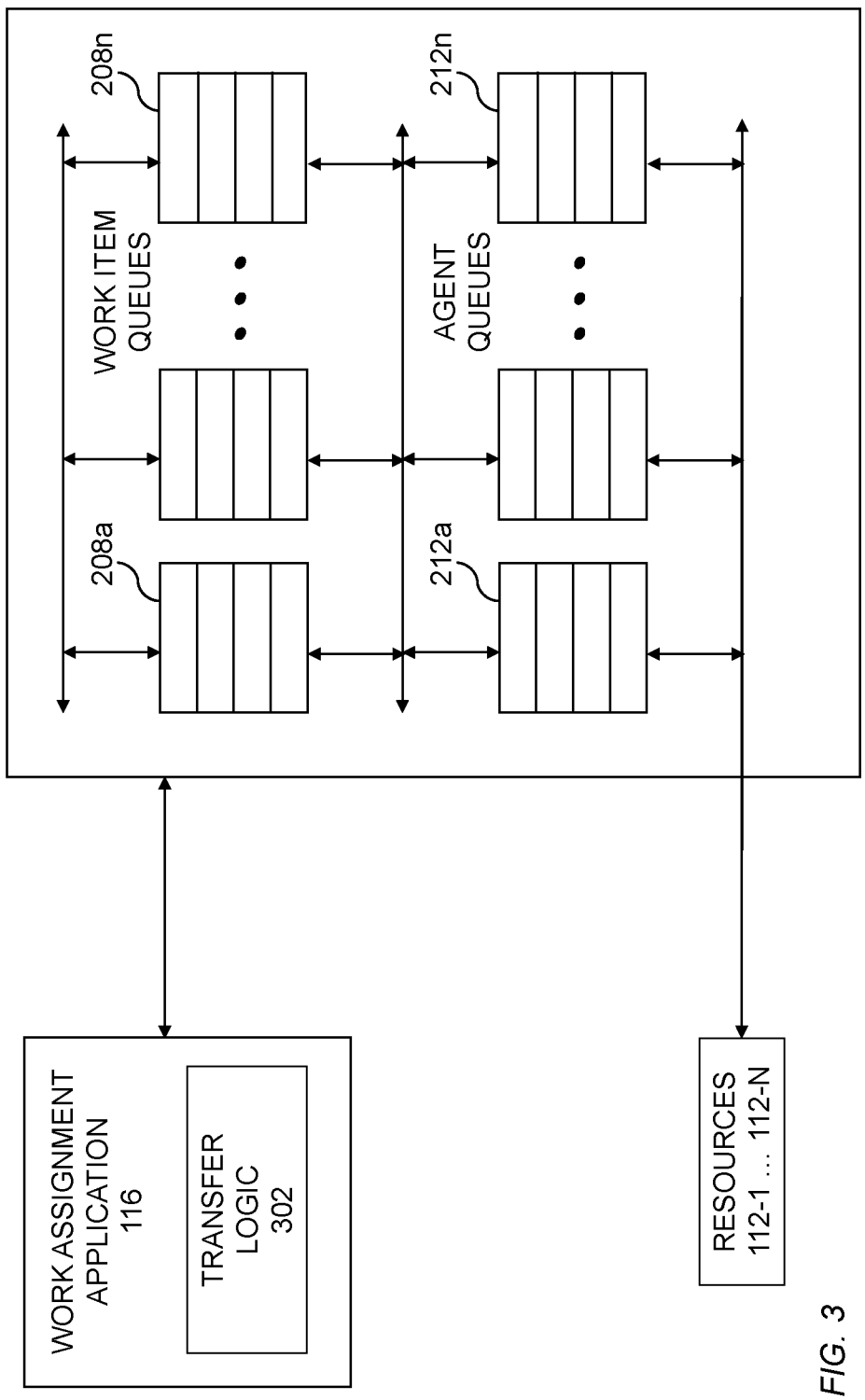
FIG. 3 illustrates a conceptual view of the connectivity of the different entities of the contact center in accordance with the principles of the present disclosure.

As may be seen in FIG. 3, included among the data stored in the server 110 (e.g., database 120 or database 114) can be a set of work item queues 208a-n and a separate set of agent queues 212a-n. Each work item queue 208a-n corresponds to a different set of agent skills, as does each agent queue 212a-n. Conventionally, work items are prioritized and are either enqueued in individual ones of the work item queues 208a-n in their order of priority or in different ones of a plurality of work item queues 208a-n that correspond to a different priority. Likewise, each agent's skills are prioritized according to his or her level of expertise in that skill, and agents are either enqueued in individual ones of agent queues 212a-n in their order of expertise level or in different ones of a plurality of agent queues 212a-n that correspond to a skill and each one of which corresponds to a different expertise level.

In some embodiments, the work assignment application 116 can operate such that contacts incoming to the contact center are assigned to different work item queues 208a-n based on a number of predetermined criteria, including customer identity, customer needs, contact center needs, current contact center queue lengths, customer value, and the agent skill that is required for the proper handling of the contact. Agents who are available for handling work items are assigned to agent queues 212a-n based on the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center may be operated by a contract operator, and each of the work item queues 208a-n, and possibly each of the agent queues 212a-n, corresponds to a different client. Each client may have a separate service level agreement or other type of performance measurement agreement with the contract operator regarding performance expectations, goals, requirements or specifications for the client's respective queue(s). The service level agreement may set forth penalties, such as financial penalties, for failing to comply with the service level agreement's requirements.

Transferring a contact, or work item, from one contact center resource to a different contact center resource is one of the basic functionalities of a contact center server. A contact center resource can, for example, include a human agent, a particular agent's queue, an agent skillset queue, or a workgroup queue. As explained above, an "agent queue" can include a queue serviced by multiple agents such that when one of the multiple agents becomes available, a contact from the front of the agent queue can be assigned to that agent.

Two conventional ways of transferring a contact include a "blind transfer" and an "announced transfer"; the latter is sometimes referred to as a "consultative transfer". FIG. 3 illustrates a conceptual view of the connectivity of the different entities of the contact center 100 involved in contact transfers. In FIG. 3, the functionality for performing transfers is depicted as transfer logic 302 and is part of the work assignment application 116. One of ordinary skill will recognize that the transfer logic 302 could be separate from the work assignment application 116 or could be cooperatively coupled with the work assignment application 116 and the routing engine 128. The transfer logic 302 initiates and manages the transfer, whether blind or announced, of a contact from an originating contact center resource to a receiving contact center resource.

In an announced transfer, the originating resource that is in communication with the contact transfers the contact by initially placing the contact in a queue for a particular contact center resource or in a queue for a particular customer service workgroup. The originating resource stays on the line with the contact until a receiving contact center resource is reached. The originating resource then informs the receiving resource of the reason for the transfer (e.g., a need for particular services of the receiving resource). At this point the originating resource can complete the transfer by disconnecting from the contact.

In a blind transfer, the originating resource transfers a contact to a receiving agent queue or workgroup queue and releases or disconnects from the contact. The originating resource does not stay on the line with the contact being transferred. In this way, the originating resource becomes available for a next incoming contact and can immediately receive and handle another contact.

In the case of blind transfers, a resource can transfer the contact to any receiving queue and logoff from the contact center server which forces the contact to wait in that receiving queue. If there is not a contact center resource available, then the contact will have to wait until a resource becomes available and can be assigned the contact from the receiving queue. Even if the originating resource does not misuse a blind transfer procedure, blind transfers can inherently cause an issue as well. If the originating agent successfully performs a blind transfer from the originating resource to the receiving resource, the receiving resource may be a queue with a number of contacts already waiting. The transferred contact must wait until it reaches the front of the receiving queue and an agent is available to handle the contact. In both blind transfer scenarios, the result can be reduced levels of customer service and decreased efficiency in the contact center operation.

One approach to avoid these problems in some contact centers is to disable blind transfer functionality. Furthermore, the disabling of this functionality does not have to be applied to all communication channels but could be applied only to certain less-loaded channels such as "chat" rather than to higher-loaded channels such as "voice call". However, once the functionality is disabled, it is unavailable for all contacts using that channel until the functionality is re-enabled. Accordingly, real-time operational parameters of the contact center or the contact center resources are not taken into consideration so as to selectively enable/disable transfer functionality.

In the case of an announced transfer, an originating resource having knowledge about workload in a particular queue can intentionally initiate a consultative transfer to a heavily loaded queue. A wallboard application, for example, is often included in a contact center server's available functionality to provide information about queue loading of the various contact center queues. Since the contact would wait in the receiving queue for the receiving contact center resource to be assigned before transfer can be completed, the initiating resource will not be assigned any new contacts until the transfer is completed and the contact is assigned to the receiving contact center resource. Even when the originating resource does not intentionally choose a heavily loaded queue, the originating agent is not available to handle a new contact until the transfer is completed. The result is lower productivity of the originating resource, lower overall throughput and efficiency of the contact center, and ultimately reduced customer service.

Figure 4:
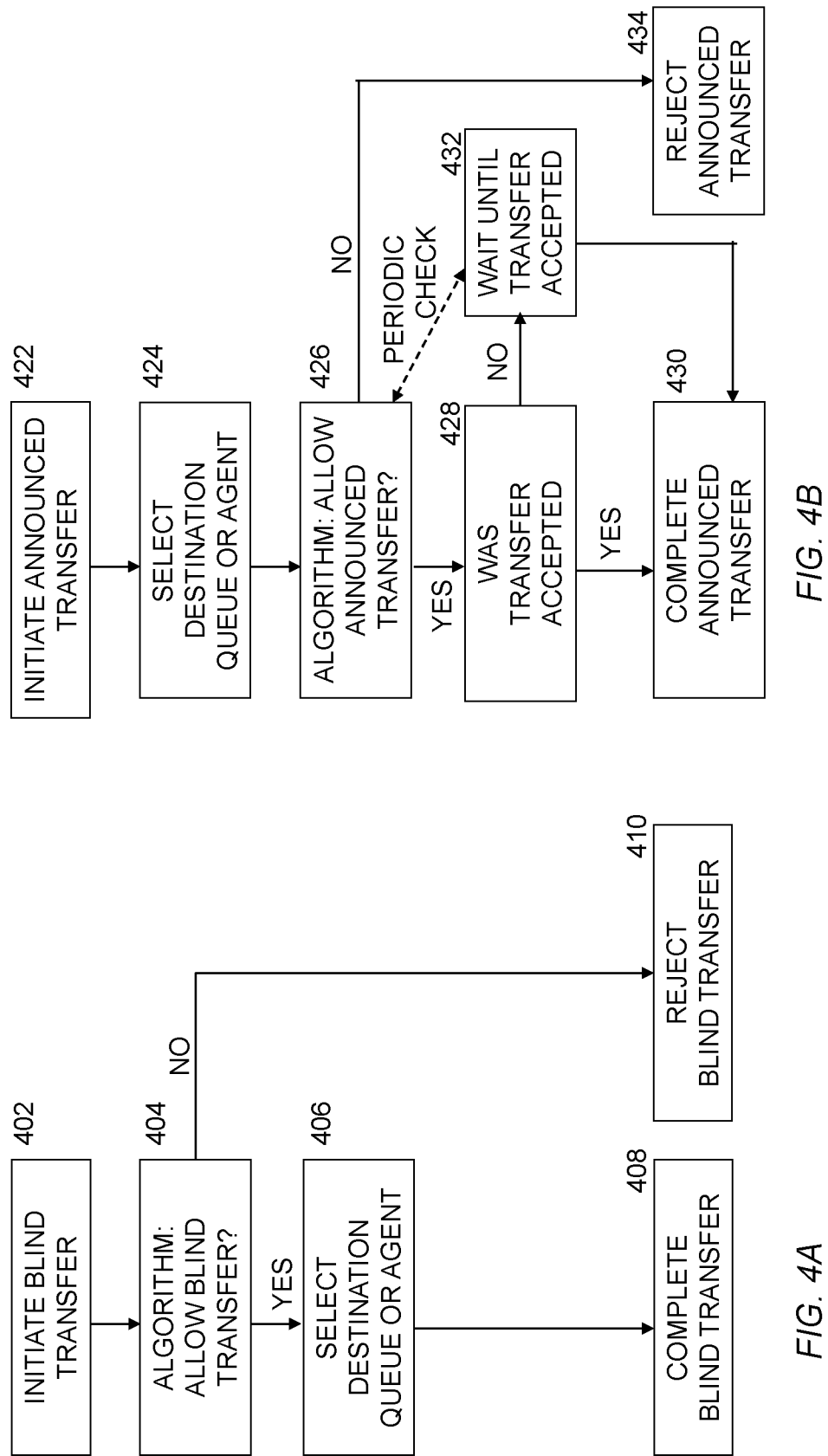
FIGS. 4A and 4B, respectively, depict an example of the workflow for a blind transfer and an announced transfer in accordance with the principles of the present disclosure.

FIGS. 4A and 4B, respectively, depict an example of the workflow for a blind transfer and an announced transfer in accordance with the principles of the present disclosure. In accordance with the flowcharts, a separate decision is dynamically made with respect to each transfer request to allow or disallow the transfer based on different, real-time parameters from the contact center situation. In some embodiments, the decision to allow or disallow a transfer can be instituted on all types of channels or limited to only one or more types of channels (e.g., multimedia call). Thus, the performing of all transfers, or all transfers for a particular channel, would include an algorithm to determine if the current contact center situation and near future predictions of contact center conditions are conducive for a requested transfer to be completed. The transfer is either allowed or rejected based on this algorithm. Example criteria for allowing or rejecting transfers are described below; however, regardless of the specific criteria applied, embodiments of the present disclosure apply a dynamic, real-time algorithm to each transfer request to determine whether or not to allow a transfer based on the contact center situation or near-future situation. The meaning of "near-future" can be a static value or dynamically calculated. For example, it may be a value (e.g., 15 minutes) set by the contact center administration. Alternatively, it may be dynamically calculated for a queue. The current queue length multiplied by the average handling time for a queue provides an estimate for the expected wait time for the next contact added to the queue and "near-future" can be defined as a value greater than or equal to the expected wait time.

Referring to FIG. 4A, an originating contact center resource interacts with the transfer logic 302 of the contact center 100 which, in step 402, initiates a blind transfer to a receiving contact resource. In step 404, the transfer logic 302 applies the above-mentioned algorithm to determine if the current contact center situation is conducive to allowing a blind transfer. If so, then in step 406, the originating resource interacts with the transfer logic 302 to cause selection of a destination queue or agent (i.e., the receiving resource for the transfer). In step 408, the transfer logic 302 completes the blind transfer. If the current contact center conditions/situation are not conducive to allowing a blind transfer, then the transfer logic 302 rejects the blind transfer request, in step 410. One of ordinary skill will recognize that in FIG. 4A, steps 402, 406, and 408 are similar with how conventional blind transfers are currently performed in contact centers.

Referring to FIG. 4B, an originating contact center resource interacts with the transfer logic 302 of the contact center 100 which, in step 422, initiates an announced transfer to a receiving contact resource. In step 424, the originating resource interacts with the transfer logic 302 to cause selection of a destination queue or agent (i.e., the receiving resource for the transfer). In step 426, the transfer logic 302 applies the above-mentioned algorithm to determine if the current contact center situation is conducive to allowing an announced transfer. If so, then the transfer logic determines, in step 428, if the transfer was accepted. If the transfer was accepted, then the announced transfer is completed in step 430 by the transfer logic 302. If the announced transfer has not been accepted, then the transfer logic 302 waits, in step 432, for the transfer to be accepted by the receiving resource.

FIG. 4B includes a dashed line between step 432 and step 426 to represent that periodic checks can be performed while waiting for the announced transfer to be accepted. Thus, step 432 can include periodically returning to step 426 to re-run the algorithm to determine if the current contact center situation is conducive to allowing the announced transfer. If the contact center parameters changed while the announced transfer is waiting to be accepted, then re-running the algorithm in step 426 may result in a different outcome than the initial time the algorithm was run. The amount of time between period checks can be a static value such as 1 minute, 5 minutes, or 20 minutes or a dynamic value based on the average contact handling time for a given queue.

If in step 426 (whether initially or during a periodic check), it was determined that current contact conditions are not conducive to an announced transfer, then the transfer logic 302 rejects the announced transfer in step 434. One of ordinary skill will recognize that in FIG. 4B, steps 422, 424, 428, 430, and 432 are similar with how conventional announced transfers are currently performed in contact centers.

As for the particular criteria used by the transfer determination algorithm employed by the transfer logic 302, a number of examples are described below without the intention of limiting the scope of the present disclosure to only the specific examples provided. The criteria described below includes the type of statistics, data, and information readily available in a modern contact center computer in which a number of computing and communication resources are networked together to cooperatively perform their respective functions.

The number of contacts that are waiting in the destination queue can be used to determine whether or not to allow a transfer to that destination queue. A predetermined threshold value for blind transfer requests and a different (or similar) predetermined threshold value for announced transfer requests can be selected. When a transfer request is received by the transfer logic 302, the number of contacts presently assigned to that destination queue can be determined by the contact center server 110. If the number of contacts already waiting in the destination queue exceeds the appropriate threshold for the transfer request, then the transfer request is rejected; otherwise, the transfer request is allowed.

Transfer requests can be rejected to prevent contacts from being cycled back into the same queue the contact was previously in. In other words, the contact was assigned to an agent from a particular queue and transfer requests which choose that particular queue as the destination queue will be rejected.

The decision to allow or reject transfers can be based on the time of day or a time left before a shift change. For example, if there is less than a predetermined amount of time left before a shift change (e.g., about 30 minutes), then all blind transfers are blocked. Furthermore, instead of allowing all announced transfers, only announced transfers to an agent may be allowed and any announced transfer to a queue is rejected.

The above criteria can be combined in complex ways to permit or reject transfer requests. For example, the number of contacts presently waiting in the destination queue can be divided by the average handling time of contacts for that destination queue. Taking in consideration the number of agents assigned to that queue and the time left before a shift change, the determination to permit or reject the transfer request can be made. As an example, a transfer attempt to a destination queue is made 60 minutes before the shift change associated with that queue. If there are 10 agents assigned to that queue and the average handling time for the queue is 30 minutes, then 20 work items/contacts can be handled before the shift change. If the transfer request would result in the transferred contact being the $21^{st}$ (or greater) contact in the destination queue, then the transfer is rejected. If there are less than 19 contacts in the destination queue, then the transfer is permitted.

As an example of the periodic check of the current contact center situation described above with respect to FIG. 4B, the number of available agents may change after an initial determination (in step 426) is made whether or not to allow the transfer. Under the initial contact center situation, a contact transfer attempt is permitted when the transferred contact is the 19th contact to be placed in the queue. However, during the wait (of step 432), one or more of the assigned agents may become unavailable such that a new threshold value is determined wherein now it is only if there are less than 18 contacts in the destination queue that a transfer is permitted. In this case, the transfer of the 19th contact to the queue, which initially was going to be allowed to take place, is now rejected when the algorithm is re-run in step 426 during one of the periodic checks.

A black-list of agents can be identified that is accessible by the transfer logic 302. This black-list could be manually compiled by a supervisor or automatically compiled by artificial intelligence that analyzes the agent's behavior related to blind transfers and/or announced transfers during a given time-period (e.g., the last week/month/90-days, etc.). The black-list can identify agents and the types of transfers that each agent is not permitted to perform. Thus, any transfer request received from that agent will be rejected.

There could be a predetermined threshold of an allowable number of transfers for an agent during each login session. If the number of transfers initiated by the agent prior to the current transfer request is less than the predetermined threshold, then the transfer request is completed. Different agents may be assigned different predetermined thresholds based on attributes about the agent (e.g., experience, skill, etc.).

The number of allowed transfers can be dependent on the destination queue such that a transfer by an agent might be permitted to one destination queue but not to a different destination queue. For example, a real-time average number of contacts for all agents have been transferred to that destination queue i.e., (all transfers)/(# of agents) can be calculated. If the number of transfers to the destination queue for a particular originating agent exceeds that average, then the transfer request can be rejected. The average can be calculated over a variety of different time periods (e.g., a login session, a week, a month, etc.) to account for random variability of the work items being handled by the agents.

The transfer logic 302 can be used to limit the number of transfers an originating resource can make in a given period of time to a particular destination queue. The decision can be fine-tuned by taking in consideration one or a combination of: the identity of the originating resource, the identity of the destination queue, the time of day, the type of transfer request, and the characteristics/attributes of the contact to be transferred. As one example, contacts can be classified based on a customer profile such as "Silver", "Gold", or "Platinum" indicating an increasing level of importance. The transfer logic 302 can, for example, be configured to permit a Silver customer to be transferred to a queue but a Platinum customer is only allowed to be transferred to a human agent.

Figure 5:
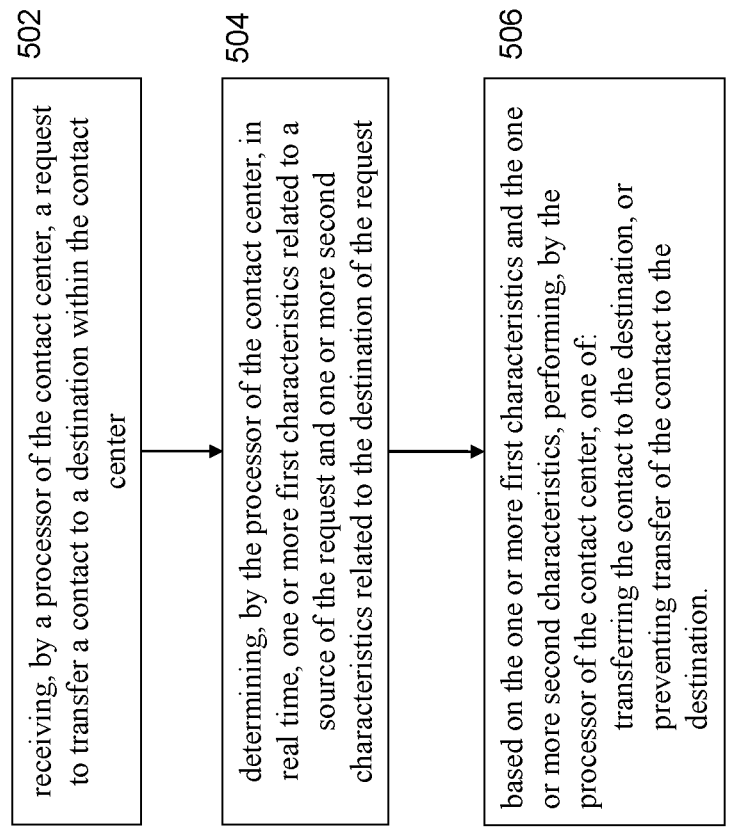
FIG. 5 which depicts an algorithm for an example method of managing transfer requests in a contact center in accordance with the principles of the present disclosure.

In general, the above examples are encompassed by FIG. 5 which depicts an algorithm for an example method of managing transfer requests in a contact center in accordance with the principles of the present disclosure.

The method begins in step 502 with a processor of the contact center receiving a request to transfer a contact to a destination within the contact center. Next, in step 504, the processor of the contact center determines in real time, one or more first characteristics related to a source of the request and one or more second characteristics related to the destination of the request. As described above, the transfer logic 302 can be part of the contact center server 110 and, therefore is in communication with one or more of the other systems, other applications, and data sources that provide functionality described with respect to the contact center 100 of FIG. 1. Thus, the transfer logic 302 can be programmed so as to poll particular data sources of the contact center 100, received periodic updates pushed by data sources of the contact center 100, and compile, analyze and compute statistical values about the agents and queues of the contact center 100 that are not readily available from the data sources. Ultimately, in step 506, based on the one or more first characteristics and the one or more second characteristics, the processor of the contact center performs one of: a) transferring the contact to the destination, or b) preventing transfer of the contact to the destination. As described above a transfer determination algorithm is employed by the transfer logic 302 of the contact center server 110 to determine whether or not to reject a particular transfer request dynamically using real-time (i.e., current) parameters of the contact center's operation.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method for managing transfer requests in a contact center, the method comprising:

receiving, by a processor of the contact center, a request to transfer a contact to a destination within the contact center;

determining, by the processor of the contact center, in real time, one or more first characteristics related to a source of the request and one or more second characteristics related to the destination of the request; and based on the one or more first characteristics and the one or more second characteristics, performing, by the processor of the contact center, one of:
transferring the contact to the destination, or
preventing transfer of the contact to the destination.

2. The method of claim 1, wherein:
the source of the request comprises one or more of an originating agent or an originating agent queue;
the one or more first characteristics related to the source comprise a number of transfer requests allotted to the originating agent over a first predetermined time period, a number of transfer requests received from the originating agent queue over a second predetermined time period, types of transfers an agent is not permitted to perform or a combination thereof;
the destination of the request comprises one or more of a receiving agent or a receiving agent queue; and
the one or more second characteristics related to the destination comprise a number of contacts assigned to the receiving agent, a number of contacts in the receiving agent queue, a number of agents assigned to the receiving agent queue, a time of day, or a combination thereof.

3. The method of claim 2, wherein the one or more second characteristics of the receiving agent queue further comprise an amount of time left before a shift change.

4. The method of claim 3, further comprising:
determining, by the processor of the contact center, based on the number of agents assigned to the receiving agent queue, an average contact handling time, and the amount of time left before the shift change, a maximum number of contacts to be assigned to a particular receiving agent queue; and
preventing, by the processor of the contact center, the transfer of the contact when the maximum number of contacts for the particular receiving agent queue would be exceeded.

5. The method of claim 2, further comprising:
determining, by the processor of the contact center, whether the request is received within a predefined time before a shift change; and
when the request is received within the predefined time before the shift change, transferring, by the processor of the contact center, the contact only to the receiving agent and only via an announced request.

6. The method of claim 2, wherein the number of transfer requests allotted to the originating agent is determined, in real time, based on one or more attributes of the originating agent, one or more attributes of the contact, the one or more second characteristics related to the destination, or a combination thereof.

7. The method of claim 6, further comprising:
restricting, by the processor of the contact center, based on a pattern of transfer requests, the number of transfer requests allotted to the originating agent.

8. The method of claim 2, further comprising:
preventing, by the processor of the contact center, the transfer when one or more of a maximum number of transfer requests allotted to the originating agent over the first predetermined time period or a maximum number of transfer requests received from the originating agent queue over the second time period would be exceeded.

9. The method of claim 1, further comprising:
determining, by the processor of the contact center, one or more characteristics related to the contact, wherein determining whether to transfer the contact is further based on the one or more characteristics related to the contact.

10. The method of claim 1, further comprising:
receiving, by the processor of the contact center, a second request to transfer the contact to a second destination within the contact center; and
preventing, by the processor of the contact center, the transfer when the second request comprises transferring the contact to the originating agent or the destination agent.

11. A system for managing transfer requests in a contact center, the system comprising:
a memory device, storing executable instructions;
a processor in communication with the memory device, the processor when executing the executable instructions:
receives a request to transfer a contact to a destination within the contact center;
determines in real time, one or more first characteristics related to a source of the request and one or more second characteristics related to the destination of the request; and
based on the one or more first characteristics and the one or more second characteristics, performs one of:
transferring the contact to the destination, or
preventing transfer of the contact to the destination.

12. The system of claim 11, wherein:
the source of the request comprises one or more of an originating agent or an originating agent queue;
the one or more first characteristics related to the source comprise a number of transfer requests allotted to the originating agent over a first predetermined time period, a number of transfer requests received from the originating agent queue over a second predetermined time period, types of transfers an agent is not permitted to perform, or a combination thereof;
the destination of the request comprises one or more of a receiving agent or a receiving agent queue; and
the one or more second characteristics related to the destination comprise a number of contacts assigned to the receiving agent, a number of contacts in the receiving agent queue, a number of agents assigned to the receiving agent queue, a time of day, or a combination thereof.

13. The system of claim 12, wherein the one or more second characteristics of the receiving agent queue further comprise an amount of time left before a shift change.

14. The system of claim 13, wherein the processor when executing the executable instructions:
determines, based on the number of agents, an average contact handling time, and the amount of time left before the shift change, a maximum number of contacts to be assigned to a particular receiving agent queue; and
prevents the transfer of the contact when the maximum number of contacts for the particular receiving agent queue would be exceeded.

15. The system of claim 13, wherein the processor when executing the executable instructions:
determines whether the request is received within a predefined time before the shift change; and
when the request is received within the predefined time before the shift change, transfers the contact only to the receiving agent and only via an announced request.

16. The system of claim 12, wherein the number of transfer requests allotted to the originating agent is determined, in real time, based on one or more attributes of the originating agent, one or more attributes of the contact, the one or more second characteristics related to the destination, or a combination thereof.

17. The system of claim 16, wherein the processor when executing the executable instructions:
restricts, based on a pattern of transfer requests, the number of transfer requests allotted to the originating agent.

18. The system of claim 12, wherein the processor when executing the executable instructions:
prevents the transfer when one or more of a maximum number of transfer requests allotted to the originating agent over the first predetermined time period or a maximum number of transfer requests received from the originating agent queue over the second time period would be exceeded.

19. The system of claim 11, wherein the processor when executing the executable instructions:
determines one or more characteristics related to the contact, wherein determining whether to transfer the contact is further based on the one or more characteristics related to the contact.

20. The system of claim 11, wherein the processor when executing the executable instructions:
receives a second request to transfer the contact to a second destination within the contact center; and
prevents the transfer when the second request comprises transferring the contact to the originating agent or the destination agent.

* * * * *

UNITED STATES PATENT AND TRADEMARK OFFICE
CERTIFICATE OF CORRECTION

PATENT NO. : 10,715,669 B2
APPLICATION NO. : 15/882076
DATED : July 14, 2020
INVENTOR(S) : Lakshmi Narayanan et al.

Page 1 of 1

It is certified that error appears in the above-identified patent and that said Letters Patent is hereby corrected as shown below:

In the Claims

Column 18, Line 22, Claim 2, "to performor a combination thereof;" should read --to perform, or a combination thereof;--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*